Patented Aug. 23, 1932

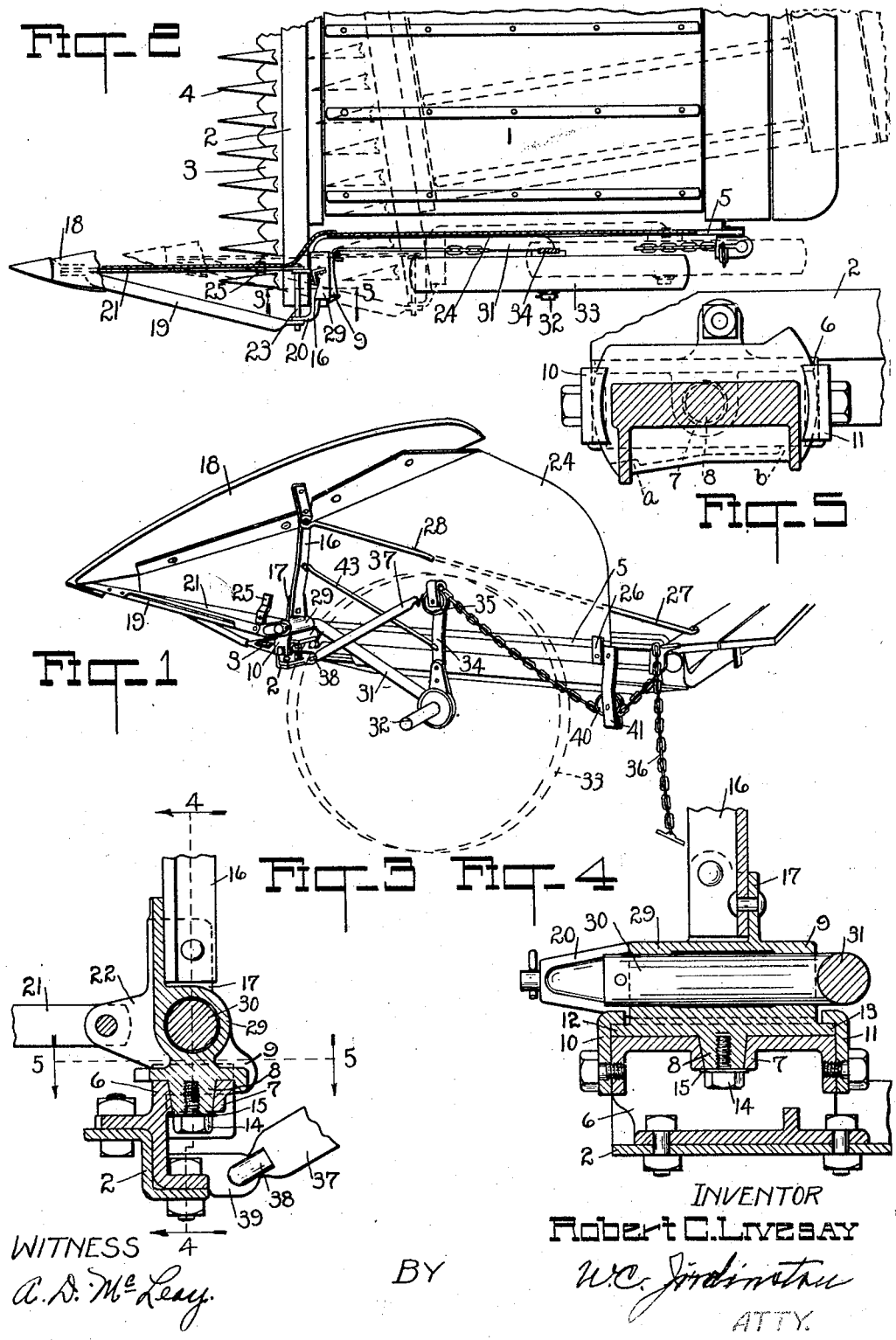

1,873,439

UNITED STATES PATENT OFFICE

ROBERT C. LIVESAY, OF MOLINE, ILLINOIS, ASSIGNOR TO DEERE & COMPANY, OF MOLINE, ILLINOIS, A CORPORATION OF ILLINOIS

AUTOMATICALLY ADJUSTABLE DIVIDER AND GRAIN WHEEL

Application filed July 3, 1929. Serial No. 375,731.

My invention relates to grain harvesters and binders and more particularly to the type employed for harvesting rice, and has for its object to provide a grain wheel and divider connected together and mounted on the harvester platform in such a manner that they will automatically remain in parallel relation with the line of draft irrespective of any tendency of the grainward end of the platform of the harvester to drag rearwardly principally because of a soft condition of the soil common in rice culture. Other objects will be disclosed in the following specification.

Referring to the drawing in which similar numerals indicate identical parts—

Figure 1 is an elevation, in perspective, of the grainward end of a harvester with my invention mounted thereon;

Figure 2 is a plan view of the grainward end of a harvester platform with my improved grain wheel and divider mounted thereon and illustrating, by dotted lines, the positions of the platform and the wheel and divider when the harvester encounters a particularly soft or muddy spot in the soil;

Figure 3 is an enlarged section, in detail, on the line 3—3 of Figure 2;

Figure 4 is a section on the line 4—4 of Figure 3, and Figure 5 is a detail on the line 5—5 of Figure 3.

Heretofore the grain wheel and outside divider have been mounted separately on the harvester and adjustment of either, when required, has been made by manually operable devices requiring an expenditure of time and labor more valuable elsewhere in the proper control of the harvester. The amount of standing grain taken by the cutting mechanism is regulated by the dividers and that quantity is constant when the harvester is moving straight ahead. If, however, the grainward end of the harvester should drag, as shown in dotted lines in Figure 2, the grainward divider, fixed in position not adjustable, will gather more grain than desired, the effect being to bend the grain, with which the divider is engaging, in a direction transversely of the line of draft, so that when cut it will fall upon the platform and be entangled with grain which has been cut and delivered to the platform conveyor in a perfect condition and so presented to the binding mechanism, in a well known manner, to form a bundle of the desired quality.

It will be apparent that if the divider is controlled so that it will remain parallel to the line of draft, irrespective of any drag of the grainward end of the platform, the quantity of grain delivered to the cutting mechanism will be uniform throughout the harvest, and to that end I have so combined the grain wheel and outside divider that they will automatically remain in parallelism with the line of draft and in alinement with each other irrespective of a rearward drag of the grainward end of the harvester.

The part of the harvester shown includes the grainward end of a platform and conveyor 1, which with the finger bar 2, the sickle bar 3 and guards 4, are mounted on the frame 5 in a well known manner. A casting 6 is rigidly bolted on the end of the finger bar 2 and is provided with a vertical bearing 7 in which is journaled a spindle 8 integral with a casting 9. The casting 9 is rotatable on the casting 6, for a limited distance, and is held securely in place by clips 10 and 11 which are bolted to the casting 6 and their upper ends bent over to clasp flanges 12 and 13 on the casting 9, and is further held by a bolt 14 between which and the bearing 7 is a washer 15 contacting with the bearing 7. The flanges 12 and 13 are curved concentrically with the axis of the spindle 8, and at their rear termination are provided with stops $a$ and $b$; when the divider and wheel are in normal position, the stop $b$ is in contact with the rear of the casting 6, the stop $a$ contacting with said casting when the grainward end of the harvester moves rearwardly for a limited distance.

A standard 16 is riveted to a lug 17, integral with the casting 9, and on its upper end is supported the divider board 18 the forward end of which is supported by a brace 19 connected thereto and extending to a lug 20, on the casting 9, to which it is attached by a pin 23. A similar brace 21, in the same horizontal plane as the brace 19, is attached to the forward end of the divider board 18 and extends to a lug 22 on the casting 9 to which it is secured by the same pin 23 which holds the brace 19 to the lug 20. A vertically disposed flexible sheet metal fender 24 is riveted to the divider board 18 and at its lower edge is attached to the brace 21 and the grainward side of the frame by clips 25 and 26. A brace 27 is secured to the standard 16 and extends rearwardly through a slot 28, in the fender 24, to the rear of the conveyor platform to which it is bolted.

Rockably journaled in a bearing 29, integral with the casting 9, is the forward portion 30 of a bar 31 which extends rearwardly and is bent at its rear end to form a spindle 32 substantially parallel with the portion 30, and on which is mounted the grain wheel 33. Between the grain wheel 33 and the platform a standard 34 is mounted on the spindle 32 and at its upper end is bent upon itself to form a loop in which is supported a sheave 35 over which leads a chain 36 connected to a link 37 having a hook 38 to engage with a lug 39 on the casting 6. The chain 36 leads rearwardly under a sheave 40, supported on a bracket 41 on the platform frame, and thence to a catch, of a common type, to which it is adapted to be secured. A rod 43 parallel with the bar 31, is pivotally attached to the standard 16 and to the standard 34.

In Figure 2 my invention, as disclosed in full lines, is operating with the harvester in perfect position so that the quantity of grain delivered to the sickle is normal, with the grain wheel and divider acting in parallelism with the line of draft. If the soil is soft however, so as to cause the grainward end of the platform conveyor to drag and assume the position shown in dotted lines in Figure 2 the divider, if rigid with the platform, will be angularly disposed grainwardly and, consequently the grain acted upon by the divider will be bent over in a stubbleward direction to be entangled with the grain directly in front of the sickle, an objectionable condition which I obviate by mounting the divider on the harvester on a vertical pivot and connecting the grain wheel with the divider in such a manner that it will be in constant alinement therewith irrespective of a rearward movement of the grainward end of the harvester.

By reason of the connection of the grain wheel to the pivoted divider at a point well forward of its axis, it is evident that the wheel will caster to travel in a straight line even when the grainward end of the harvester drags rearwardly or when it returns to normal position when firm soil is reached, as clearly disclosed in Figure 2, so that the gather of grain to the cutting mechanism is uniform at every period of the harvest. The divider is raised or lowered simultaneously with the grainward end of the harvester without affecting the relation of the divider and wheel to the line of draft.

What I claim is—

1. In a harvester, the combination therewith of a divider, a grain wheel pivotally connected to the divider, said divider supported on the grainward end of the harvester on a substantially vertical pivot forward of the axis of said wheel, said divider and wheel adapted to operate in parallel relation with the line of draft irrespective of a rearward movement of the grainward end of the harvester.

2. In a harvester, the combination therewith of a divider pivotally supported on the grainward end of the harvester to swing laterally, a grain wheel connected with the divider on a horizontal pivot, said divider and grain wheel operating in parallel relation with the line of draft and automatically castering to maintain said relation irrespective of a rearward movement of the grainward end of the harvester and means operative with said wheel to raise or lower said grainward end irrespective of the rearward movement thereof.

3. In a harvester, the combination with the cutter bar, of a divider supported on the grainward end thereof on a substantially vertical pivot, a grain wheel connected with the divider by a horizontal pivot and in substantial permanent alinement with the divider and rearward of the pivot thereof, the divider and grain wheel operating in parallel relation with the line of draft and automatically castering to maintain said relation irrespective of a rearward movement of the grainward end of the harvester.

4. In a harvester, the combination therewith of a divider pivotally supported on the grainward end of the harvester, a grain wheel connected with the divider on a horizontal pivot in substantial permanent alinement with the divider and rearward of the pivot thereof, said divider and grain wheel operating in parallel relation with the line of draft and automatically castering to maintain said relation irrespective of a rearward movement of the grainward end of the harvester, and means operative with said wheel to raise or lower the grainward end of the harvester irrespective of said movement.

5. In a harvester, the combination with the cutter bar, of a divider supported on the grainward end of the cutter bar on a vertical pivot, a grain wheel connected with the divider on a horizontal pivot and in alinement with the divider, and rearward of the pivot thereof said divider and grain wheel operating in parallel relation with the line of draft and automatically castering to maintain said relation irrespective of a rearward movement of the grainward end of the harvester, and means operative with the grain wheel to raise and lower the grainward end of the harvester and the divider irrespective of said movement.

6. A harvester having a grain wheel, means pivotally connecting the grain wheel to the grainward end of the harvester for castering movement with respect to said end and a divider mounted on the connecting means forwardly of said wheel and movable therewith.

7. A harvester having a grain wheel pivotally connected to the grainward end of the harvester for castering movement with respect thereto, a divider on the harvester and connections therewith for maintaining the divider in constant angular relation with respect to the wheel.

8. A harvester having a divider and a support therefor mounted on the harvester for movement in a horizontal plane with respect to the harvester, a grain wheel supporting member connected to said support rigid againt lateral movement with respect to said support but movable vertically with respect thereto, and a grain wheel carried at the rear end of the supporting member.

9. A harvester having a divider and a support therefor mounted on the harvester for movement in a horizontal plane with respect to the harvester, a grain wheel supporting member connected to said support rigid against lateral movement with respect to said support but movable vertically with respect thereto, a grain wheel carried at the rear end of the supporting member, a standard carried by said supporting member, and means carried by said standard for controlling the relative vertical position of the grain wheel with respect to the harvester.

10. A harvester having a divider and a support therefor mounted on the harvester for movement in a horizontal plane with respect to the harvester, a grain wheel supporting member connected to said support rigid against lateral movement with respect to said support but movable vertically with respect thereto, a grain wheel carried at the rear end of the supporting member, a standard carried by said supporting member, and means carried by said standard for controlling the relative vertical position of the grain wheel with respect to the harvester, said means comprising a flexible element connected at opposite ends to the harvester, and connected intermediate its ends with the standard.

ROBERT C. LIVESAY.